(12) United States Patent
Jaeger et al.

(10) Patent No.: US 12,489,279 B2
(45) Date of Patent: Dec. 2, 2025

(54) AIRCRAFT WIRE HARNESS

(71) Applicant: HarcoSemco, LLC, Branford, CT (US)

(72) Inventors: Mark Jaeger, North Branford, CT (US); William Hinman, Meriden, CT (US)

(73) Assignee: HarcoSemco, LLC, Branford, CT (US)

( * ) Notice: Subject to any disclaimer, the term of this patent is extended or adjusted under 35 U.S.C. 154(b) by 447 days.

(21) Appl. No.: 18/154,307

(22) Filed: Jan. 13, 2023

(65) Prior Publication Data

US 2024/0239276 A1 Jul. 18, 2024

(51) Int. Cl.
*H02G 1/08* (2006.01)
*H02G 3/06* (2006.01)
*H02G 3/22* (2006.01)

(52) U.S. Cl.
CPC .............. *H02G 1/08* (2013.01); *H02G 3/0675* (2013.01); *H02G 3/22* (2013.01)

(58) Field of Classification Search
CPC ........... H02G 1/08; H02G 3/22; H02G 3/0675
USPC ........................................................ 174/650
See application file for complete search history.

(56) References Cited

U.S. PATENT DOCUMENTS 1,886,660 A 11/1932 Esping
2,813,692 A 11/1957 Bremer et al.
8,357,853 B1 * 1/2013 Gretz ..................... H02G 3/14
                                                                174/67
11,079,044 B2 * 8/2021 West ..................... B64D 45/02
11,352,147 B2 * 6/2022 Walters ................ B64D 37/005

FOREIGN PATENT DOCUMENTS

EP 3729565 B1 7/2022
GB 1382981 A 2/1975
GB 2219697 A 12/1989
JP 5092062 B1 12/2012

OTHER PUBLICATIONS

International Search Report and Written Opinion of corresponding International Application No. PCT/US2024/011140, dated May 15, 2024, 13 pages.

* cited by examiner

*Primary Examiner* — Timothy J Thompson
*Assistant Examiner* — Michael F McAllister
(74) *Attorney, Agent, or Firm* — Tucker Ellis LLP

(57) ABSTRACT

Provided is a transition assembly for a wire harness configured to be coupled to a plate in an aircraft. The transition assembly includes a slotted flange configured to abut a first side of the plate, a junction having a flange configured to abut a second side of the plate, the flange including inwardly extending cutouts on opposite sides thereof forming a reduced width portion of the flange, and a nut configured to couple to the junction.

20 Claims, 13 Drawing Sheets

AIRCRAFT WIRE HARNESS

FIELD OF INVENTION

The present invention relates generally to a wire harness, and more particularly to a wire harness for an aircraft.

BACKGROUND

Modern aircraft that are operating at high speeds are known to be subjected to great stress, strain and shock. Accordingly, a thermocouple apparatus in the aircraft must not only be adapted to elevated states and rapid changes of temperature, but it must also be characterized by robust design and construction to reliably operate at these severe environmental conditions. Additionally, the thermocouples have to be located at points spaced about the periphery of the gas turbine tail cone or pipe in order to obtain meaningful temperature measurements. Furthermore, the thermocouples are mounted about the tail cone or pipe of the gas turbine in such a way that the failure of any one or more of the thermocouples does not affect or nullify the functioning of any other of the thermocouples, and so that their total or average indication is utilized as the significant value or measurement of gas stream temperature.

SUMMARY OF INVENTION

According to an aspect, a transition assembly of a wire harness configured to be coupled to a plate in an aircraft is provided. The transitional assembly includes a slotted flange configured to abut a first side of the plate, a junction having a flange configured to abut a second side of the plate, the flange including inwardly extending cutouts on opposite sides thereof forming a reduced width portion of the flange, and a nut configured to couple to the junction.

According to another aspect, a junction configured to be coupled to a plate in an aircraft is provided. The junction includes a body having a first end, a second end configured to extend through an opening in the plate, and a passage extending therethrough between the first and second ends, a flange surrounding the body and configured to abut a side of the plate, the flange including a first portion with a first width in a lateral direction perpendicular to a longitudinal direction of the body and a second portion with a second width in the lateral direction greater than the first width, and an attachment area on an outer surface of the body between the second end and the flange.

According to still another aspect, a method of installing a wire harness in a compartment in an aircraft is provided. The wire harness includes a high temperature section and a low temperature section separated by a transition assembly, and the transition assembly includes a junction having a flange with cutouts on opposite sides thereof. The method includes advancing the high temperature section of the wire harness through an opening in a plate in the compartment of the aircraft, navigating the transition assembly around components in the compartment, coupling the transition assembly to the plate, and coupling connectors of the wire harness with corresponding connectors in the aircraft.

The foregoing and other features of the application are described below with reference to the drawings.

DETAILED DESCRIPTION

Figure 1:
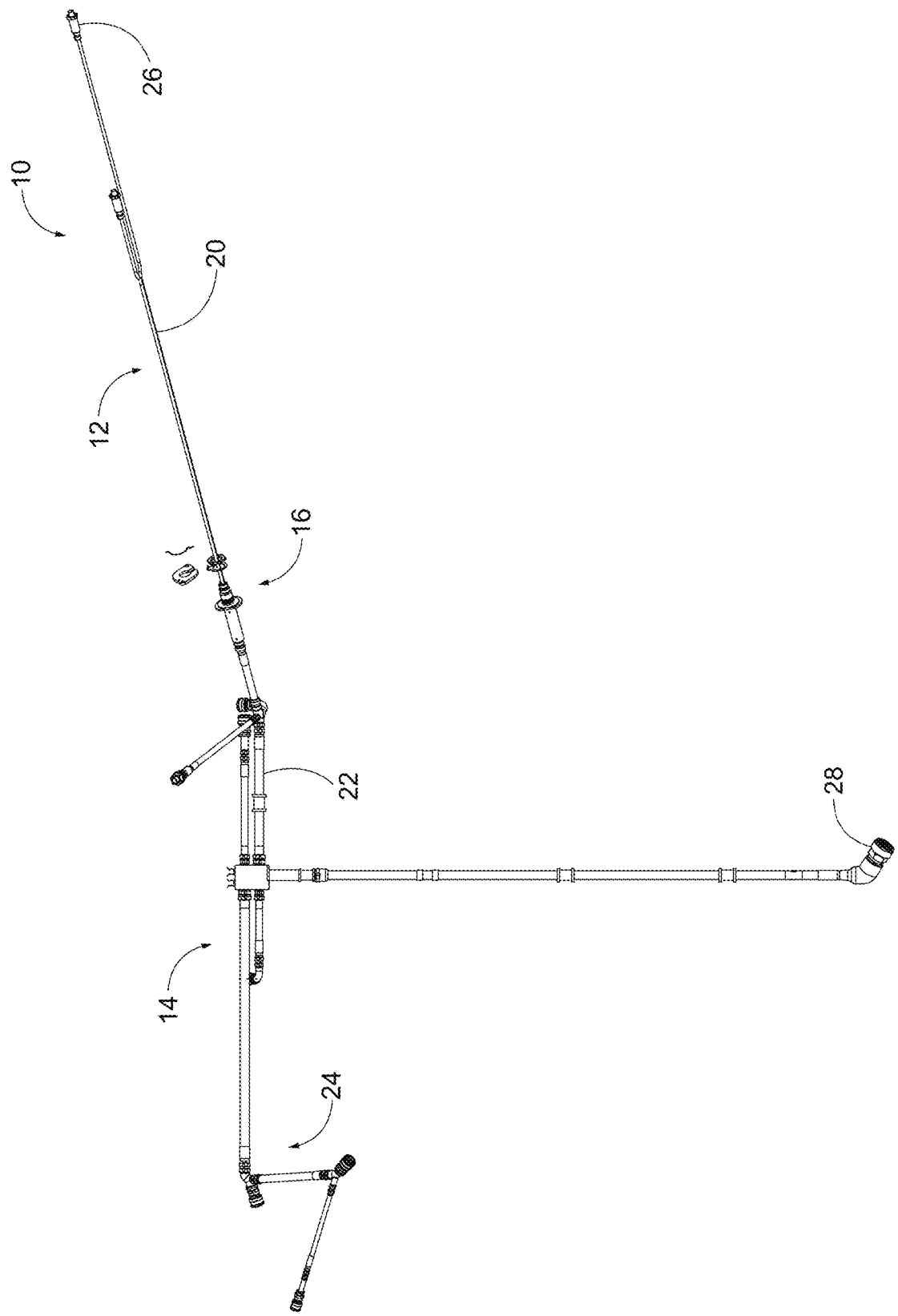
FIG. 1 is a perspective view of an exemplary wire harness.

Turning initially to FIG. 1, a wire harness, such as a thermocouple wire harness for an aircraft is shown generally at reference numeral 10. The wire harness 10 is designed to be installed around the turbine engine of the aircraft to obtain temperature measurements from the engine. The wire harness 10 includes a high temperature section 12 and a low temperature section 14 separated by a transition assembly 16 configured to be coupled to a mounting plate 18 (FIG. 2) in the aircraft. The design of the wire harness 10 allows the high temperature section 12 to be fed through the mounting plate 18 during installation and then the transition assembly 16 attached rather than coupling separate wire harnesses together at the mounting plate 18.

The high temperature section 12 includes a high temperature branch 20, and the low temperature section 14 includes a low temperature branch 22, which may include a plurality of branches 24. The branch 20 terminates at one or more connectors 26, and as shown a pair of connectors 26 configured to be coupled to probe assemblies on the engine, and the branches 24 terminate at connectors 28 where wires disposed in the branches 22 can be coupled to thermocouples.

Figure 2:
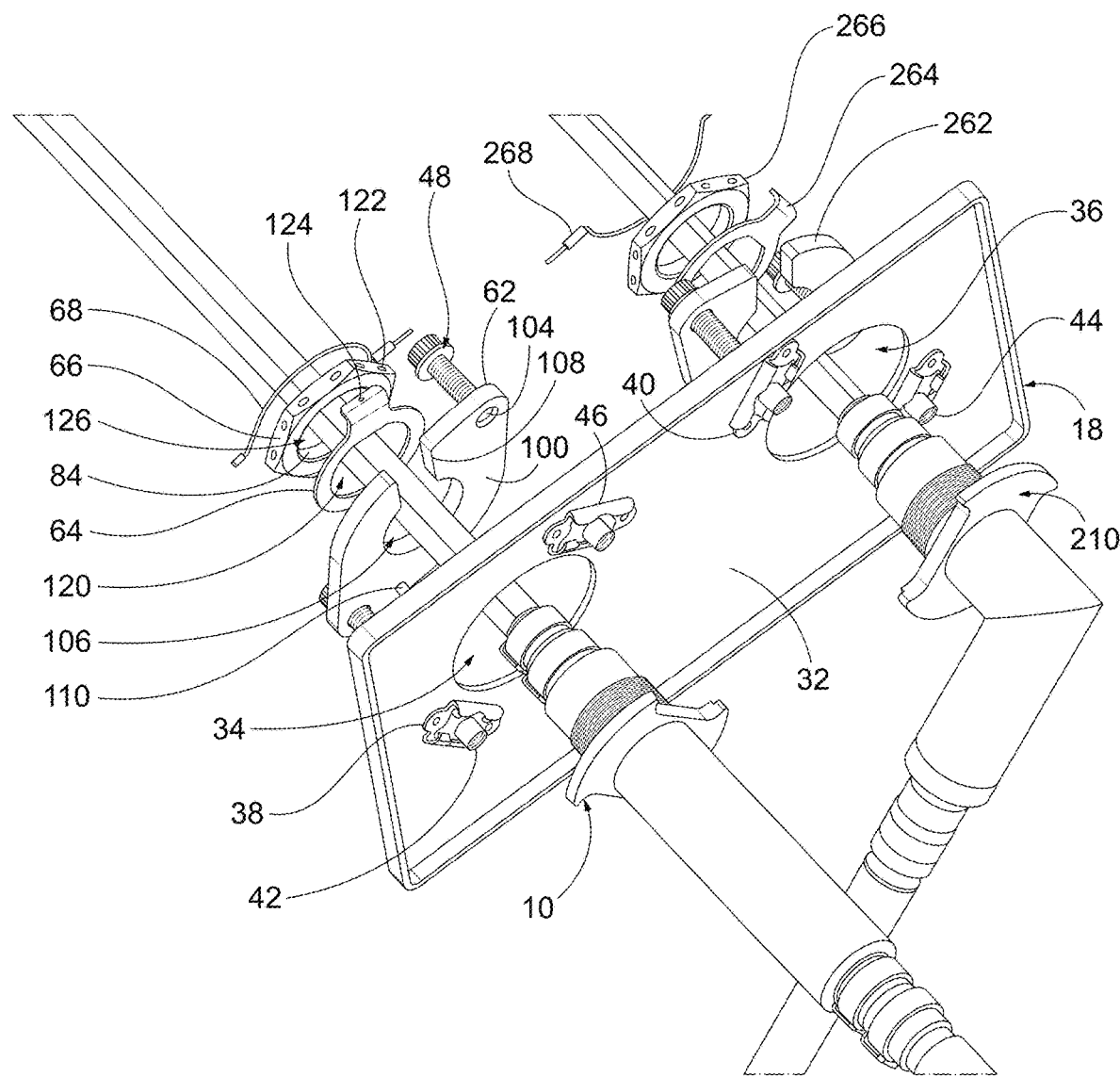
FIG. 2 is an exploded view of a transition assembly of the wire harness and of a mounting plate.
Figure 3:
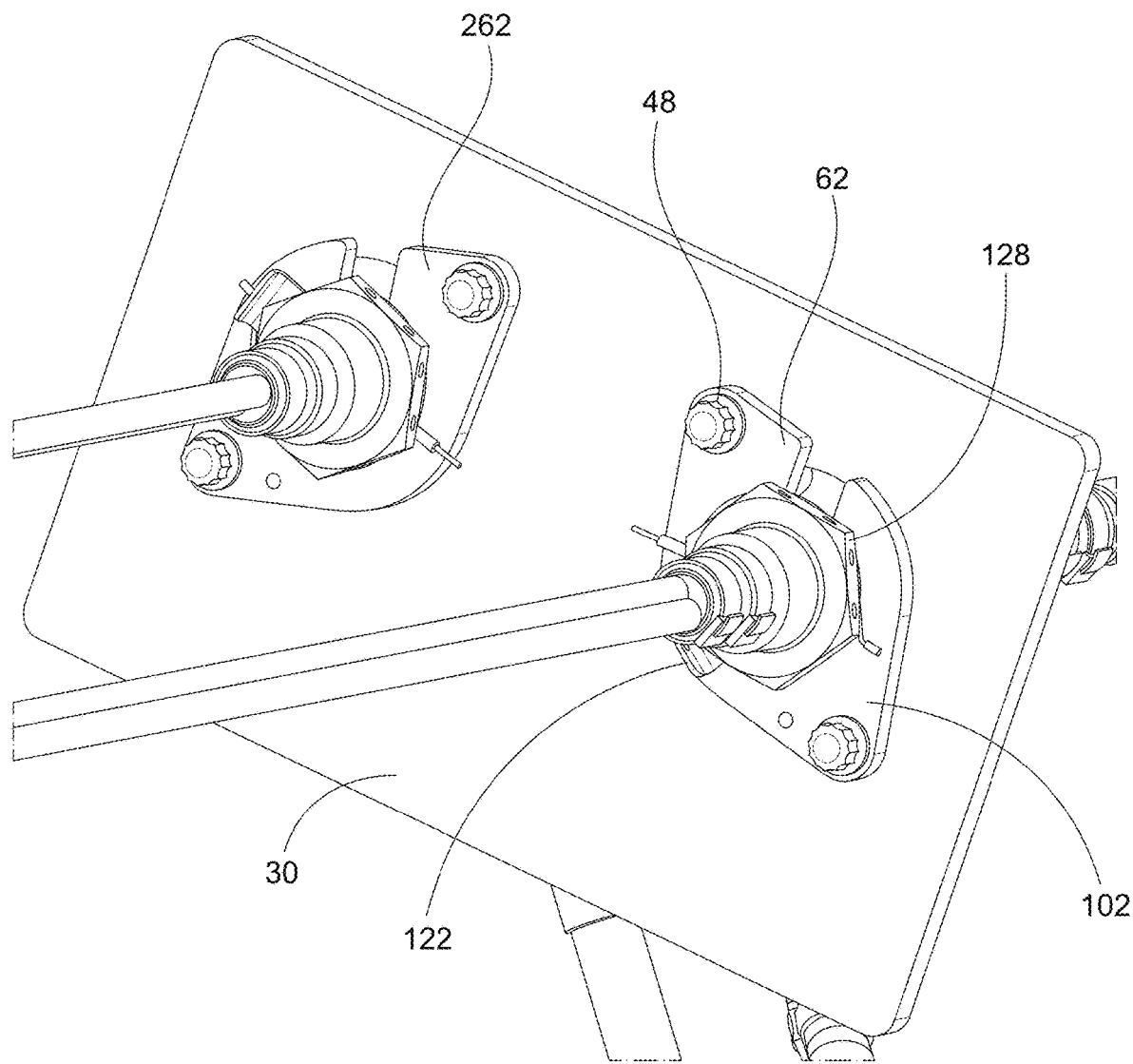
FIG. 3 is a perspective view of the transition assembly coupled to the mounting plate.
Figure 4:
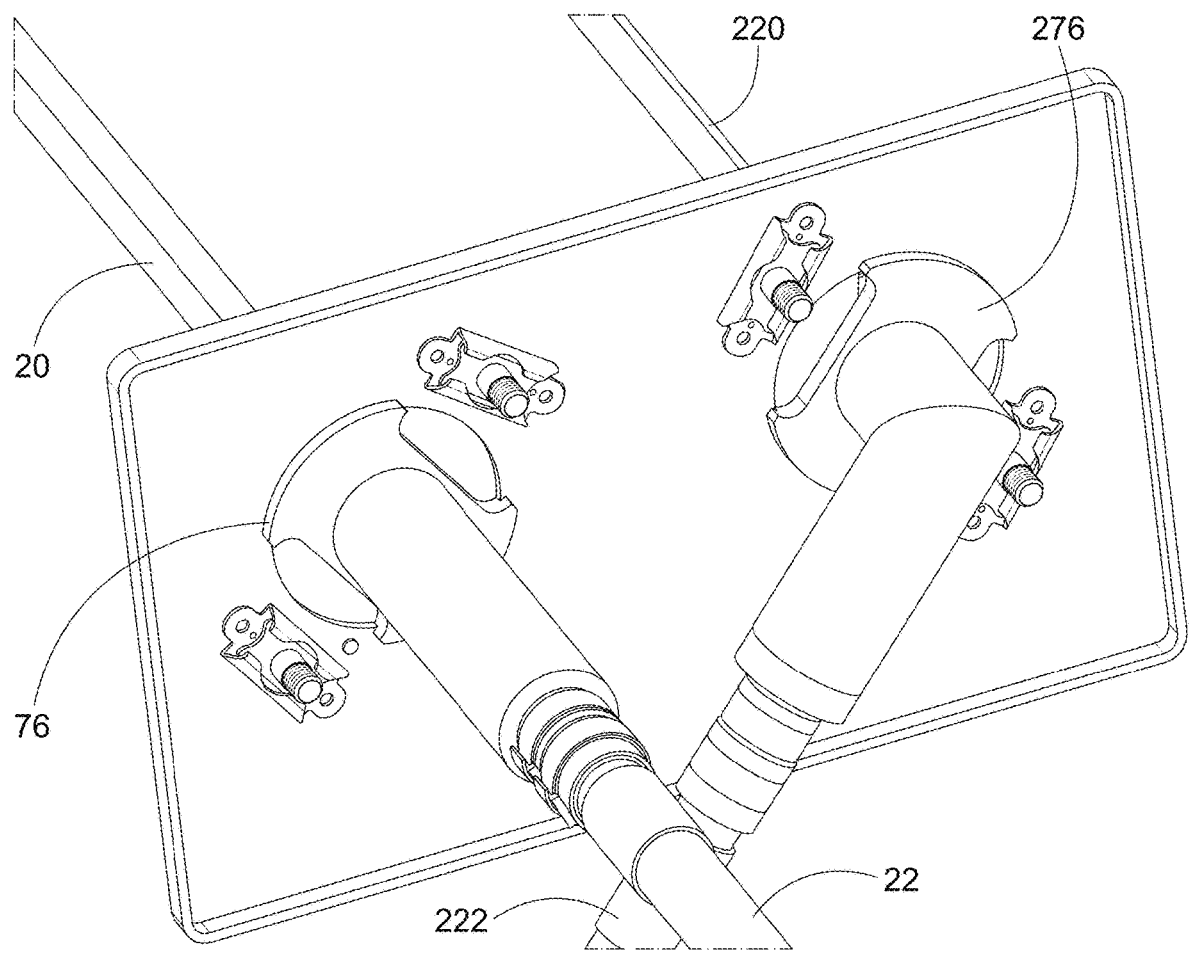
FIG. 4 is another perspective view of the transition assembly coupled to the mounting plate.
Figure 5:
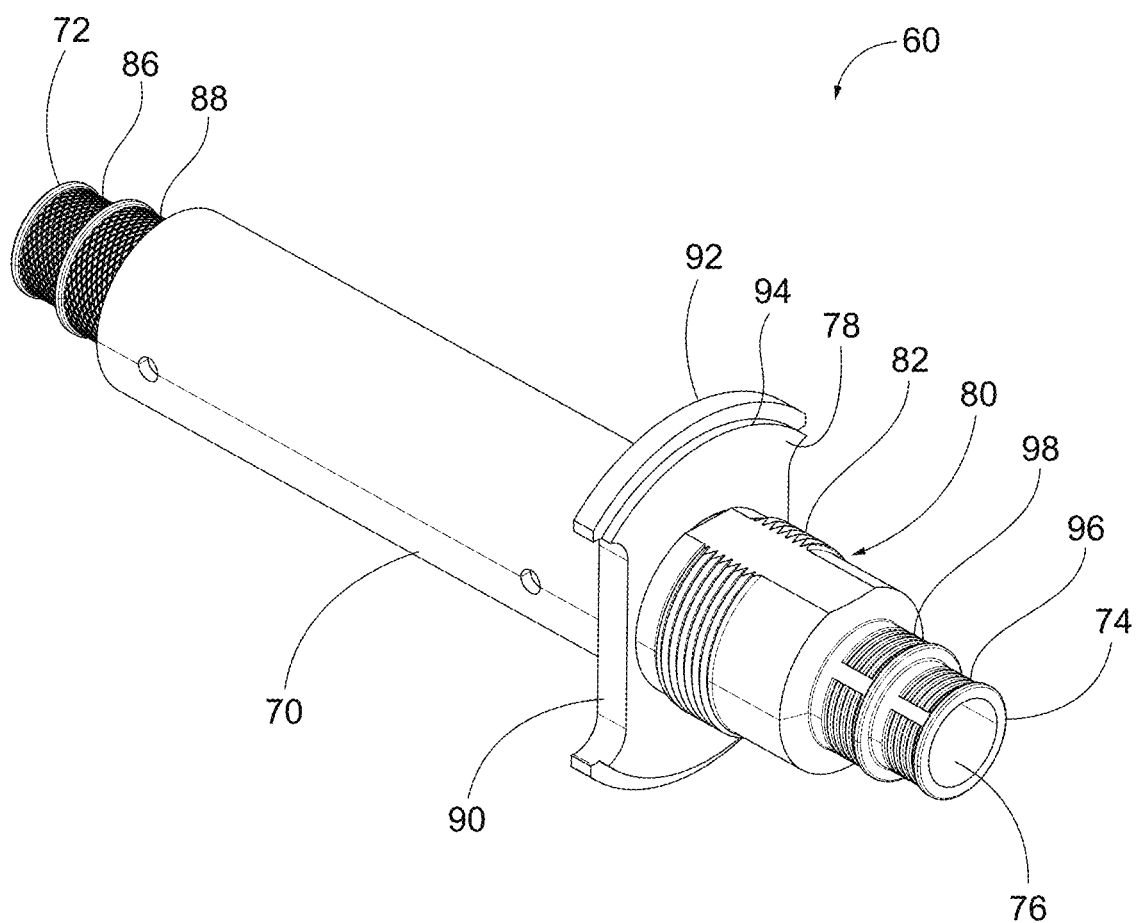
FIG. 5 is a perspective view of a junction of the transition assembly.
Figure 6:
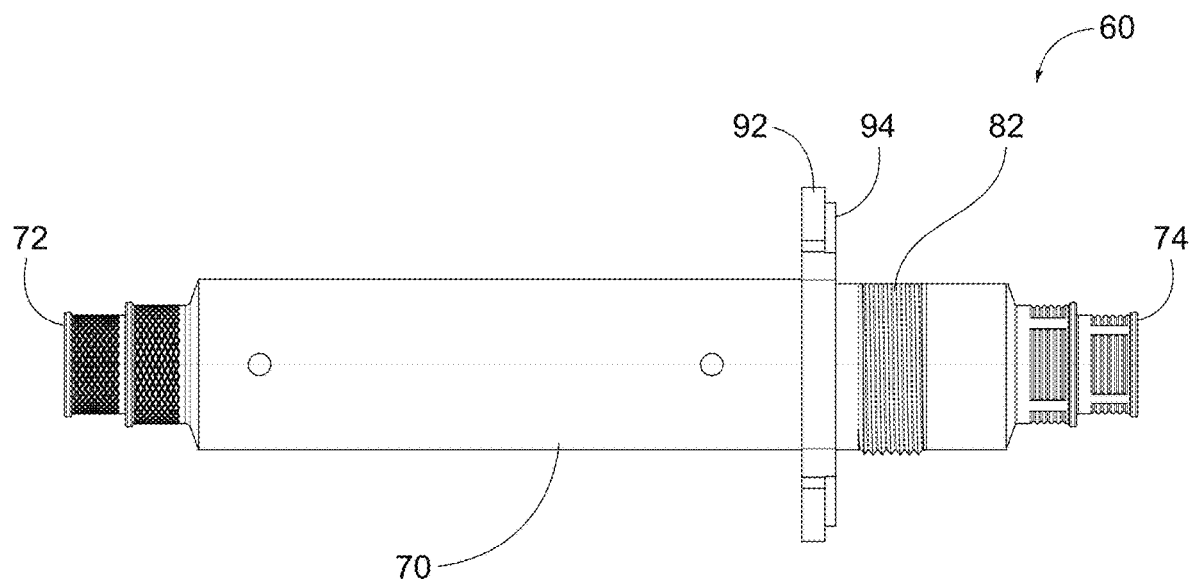
FIG. 6 is a right side view of the transition assembly.
Figure 7:
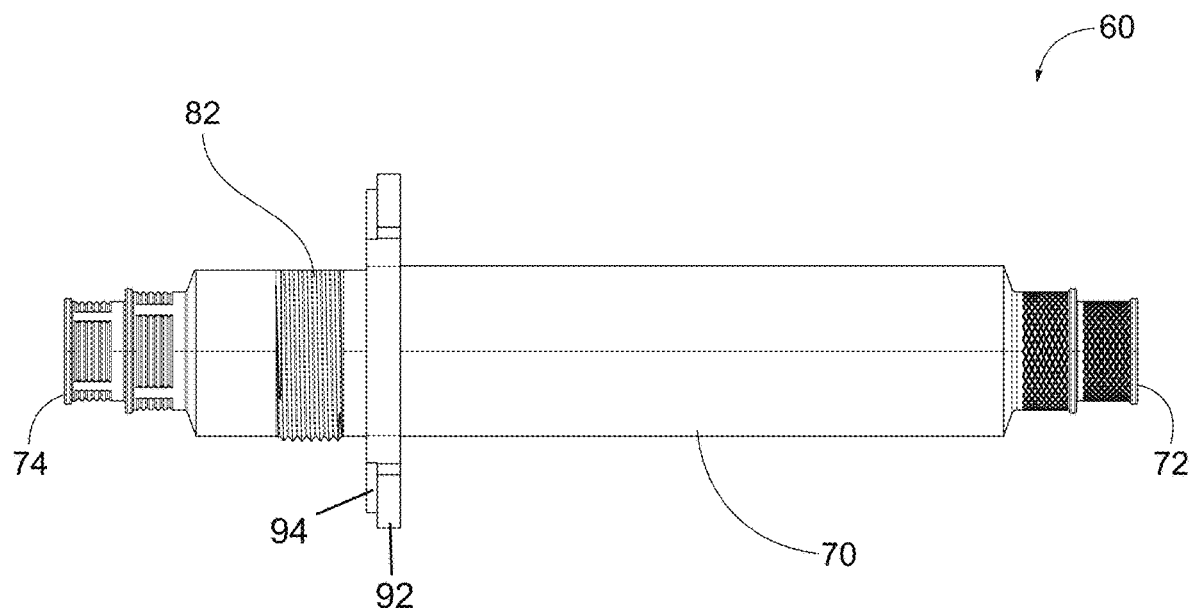
FIG. 7 is a left side view of the transition assembly.
Figure 8:
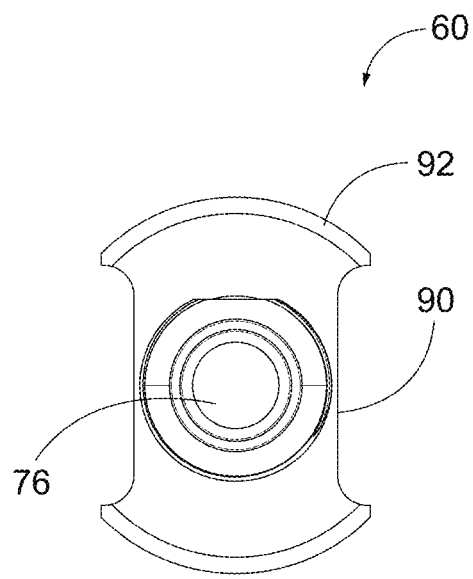
FIG. 8 is a front view of the transition assembly.
Figure 9:
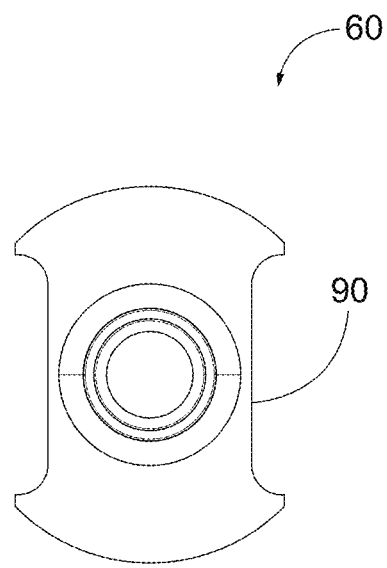
FIG. 9 is a rear view of the transition assembly.
Figure 10:
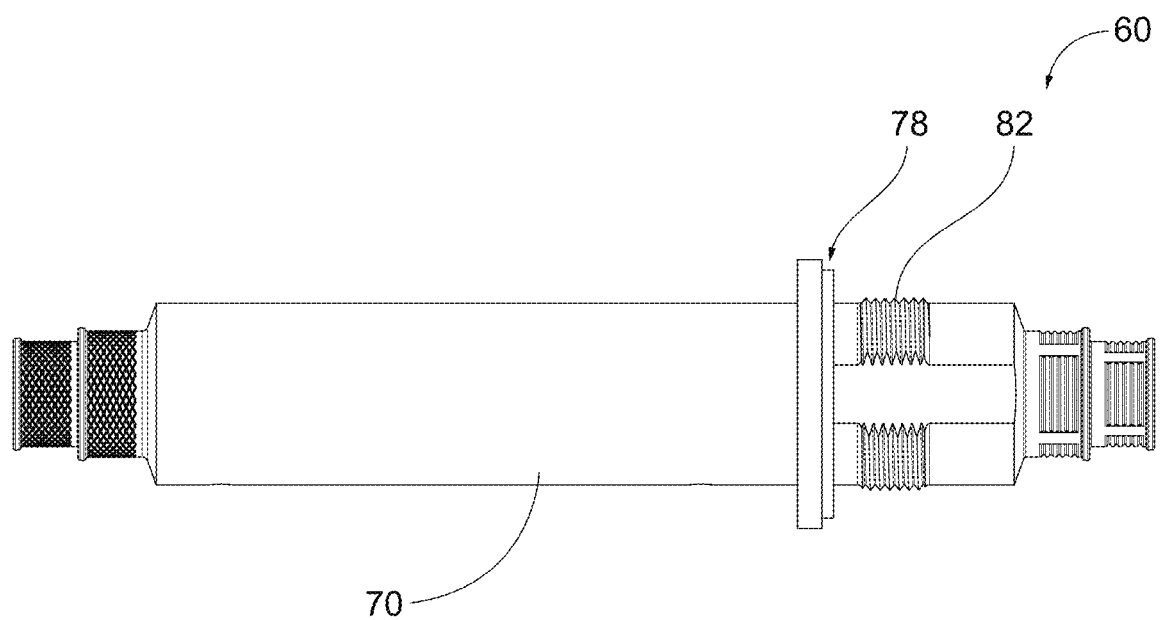
FIG. 10 is a top view of the transition assembly.
Figure 11:
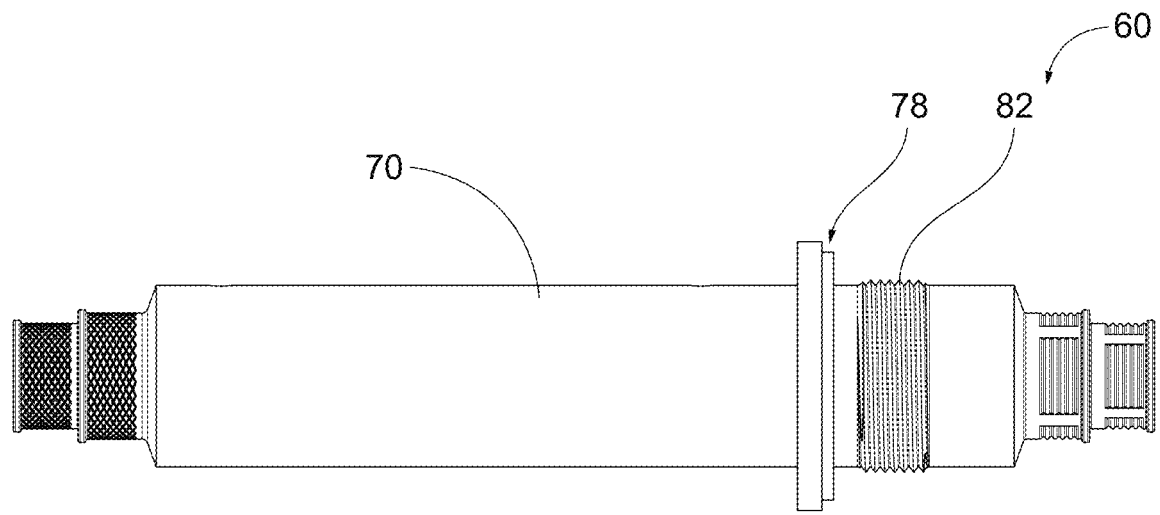
FIG. 11 is a bottom view of the transition assembly.

Turning additionally to FIGS. 2-4, the mounting plate 18 will be described in detail. The mounting plate 18 includes a first side 30, for example a side oriented towards the high temperature side of the engine, and a second side 32, for example a side oriented toward the low temperature side of the engine. The mounting plate 18 also includes a first opening 34 through which the high temperature section 12 of the wire harness 10 is fed during installation, and a second opening 36 laterally spaced from the first opening 34 through which a high temperature section of a second wire harness, for example a high temperature section 212 of wire harness 210 discussed below, is fed during installation. Surrounding each of the first and second openings 34 and 36 is a respective orientation opening 38, 40 and a respective pair of attachment openings 42, 44. Each attachment opening 42, 44 is abutted on the second or low temperature side 32 of the mounting plate by a clip 46 configured to receive a fastener 48 to secure a flange assembly of the transition assembly 16 to the mounting plate 18.

Turning to FIGS. 5-11 in addition to FIGS. 2-4, the transition assembly 16 will be described in detail. The transition assembly 16 includes a junction 60, a slotted flange 62, a washer 64, a nut 66, and a cable 68. The junction 60 includes a body 70 having a first end 72 configured to be coupled to the low temperature branch 22, a second end 74 configured to be coupled to the high temperature branch 20, and a passage 76 extending therethrough for wires to pass through the junction 60. The junction 60 also includes a flange 78 surrounding the body 70 configured to abut the low temperature side 32 of the mounting plate 18, and an attachment area 80 on the body 70 between the second end 74 and the flange 78. The attachment area 80 may include threads 82 configured to mate with corresponding threads 84 on the nut 66 to secure the junction 60 to the mounting plate 18.

The flange 76 includes cutouts or scallops 90 on opposite sides thereof that extend inward toward the body 70 reducing a width of a portion of the flange 76 in a longitudinal direction perpendicular to a longitudinal direction of the body 70. The cutouts 90 allow the junction 60 to be rotated and otherwise moved during installation in the aircraft to provide clearance and avoid interference with bolts, fittings, and other components installed around the engine of the aircraft. The flange 78 also can include abutment regions 92 above and below the cutouts 90 providing increased surface area for the flange 78 to increase the contact between the flange 78 and the mounting plate 18 around the opening 34, and ledges 94 configured to abut inner surfaces of the mounting plate 18 in the opening 34.

The body 70 can also include stepped regions 86 and 88 at the first end 72 and stepped regions 96 and 98 at the second end 74. The stepped regions have differing diameters from one another to receive sheaths of the wire harness. Suitable bands of the wire harness may be placed over the sheaths to secure the sheaths to the respective stepped region 86, 88, 96, 98.

The slotted flange 62 includes a first side 100 configured to abut the high temperature side 30 of the mounting plate 18, a second side 102 configured to be abutted by the washer 64, a pair of openings 104, a through hole 106, a slot 108 into the through hole 106, and an orientation projection 110 configured to be received in the orientation opening 38 in the mounting plate 18 to align the slotted flange 62. The pair of openings 104 are configured to receive the fasteners 48 to allow the fasteners 48 to be coupled to the clips 46. The through hole 106 is configured to allow wires to extend therethrough and the slot 108 extends from the through hole 106 to an outer edge of the slotted flange 62 to allow the slotted flanged 62 to be placed around the wires once positioned by the mounting plate 18.

The washer 64 includes a through hole 120 to allow wires to extend therethrough and a projection 122 extending from a side and having an opening 124 for receiving the cable 68. Similarly, the nut 66 includes a through hole 126 to allow wires to extend therethrough and openings 128 in the side for receiving the cable 68. The cable 68 is woven through at least two of the openings 128 and has one end extending through the opening 124 in the projection 122 and another end extending out one of the openings 128 to prevent the nut 66 from uncoupling from the junction 60 during use, for example due to vibration.

To install the wire harness 10 in the aircraft, the high temperature branch 20 and connectors 26 are advanced through the first opening 34 in the mounting plate 18 and components of the harness 10, including the flange 76 of the junction 60, are navigated around the engine components to position the harness components in their desired locations. The cutouts 90 of the flange 76 enable the junction 60 to be navigated to position without interference by engine components. The junction 60 is positioned such that the second end 74 of the junction 60 extends through the first opening 34 in the mounting plate 18 into the high temperature area of the engine, and the flange 76, including the abutment regions 92, abut the second side 32 of the mounting plate 18 around the first opening 34 as shown in FIG. 4. The washer 64 and the nut 66 can then be advanced over the connectors 26, or be positioned at any suitable time, such that the high temperature branch 20 extends through the through holes 120 and 126 in the washer 64 and the nut 66 respectively.

The slotted flange 62 can then be positioned, or be positioned at any suitable time, by advancing the high temperature branch 20 through the slot 108 to be surrounded by the through hole 106. The slotted flange 62 is then positioned relative to the mounting plate 18 by aligning the orientation projection 110 with the orientation opening 38 in the mounting plate. The slotted flange 62 is then positioned such that the first side 100 of the slotted flange abuts the first side 30 of the mounting plate 18, the orientation projection 110 is disposed in the orientation opening 38, and the openings 104 are aligned with the attachment openings 42 that surround the first opening 34. The fasteners 48 can then be inserted through the openings 104 and 42 and secured to the respective clips 46 to couple the slotted flange 62 to the mounting plate 18.

When the slotted flange 62 is secured to the mounting plate 18, the second end 74 of the junction 60 extends through the through hole 106 in the slotted flange 62 or can be later positioned to extend through the through hole 106. The washer 64 can then be advanced to abut the second side 102 of the slotted flange 62 over the body 70 of the junction 60 and the nut 66 can be advanced to abut the washer 64 over the body 70. The nut 66 is rotated such that the threads 84 engage the threads 82 on the attachment area 80 of the body to couple the nut 66 to the junction 60, thereby securing the transition assembly 16 to the mounting plate 18 as shown in FIG. 3. The cable 68 can then be inserted into the opening 124 and openings 128 to prevent the nut from uncoupling from the attachment area 80.

It will be appreciated that the various attachment steps, such as the securing of the fasteners 48, the coupling of the nut 66 to the junction 60, etc., may be performed in any suitable order.

Turning now to FIGS. 12-19, an exemplary embodiment of the wire harness is shown at 210. The wire harness 210 is substantially the same as the above-referenced wire harness 10, and consequently the same reference numerals but indexed by 200 are used to denote structures corresponding to similar structures in the wire harnesses. In addition, the foregoing description of the wire harness 10 is equally applicable to the wire harness 210 except as noted below.

Figure 12:
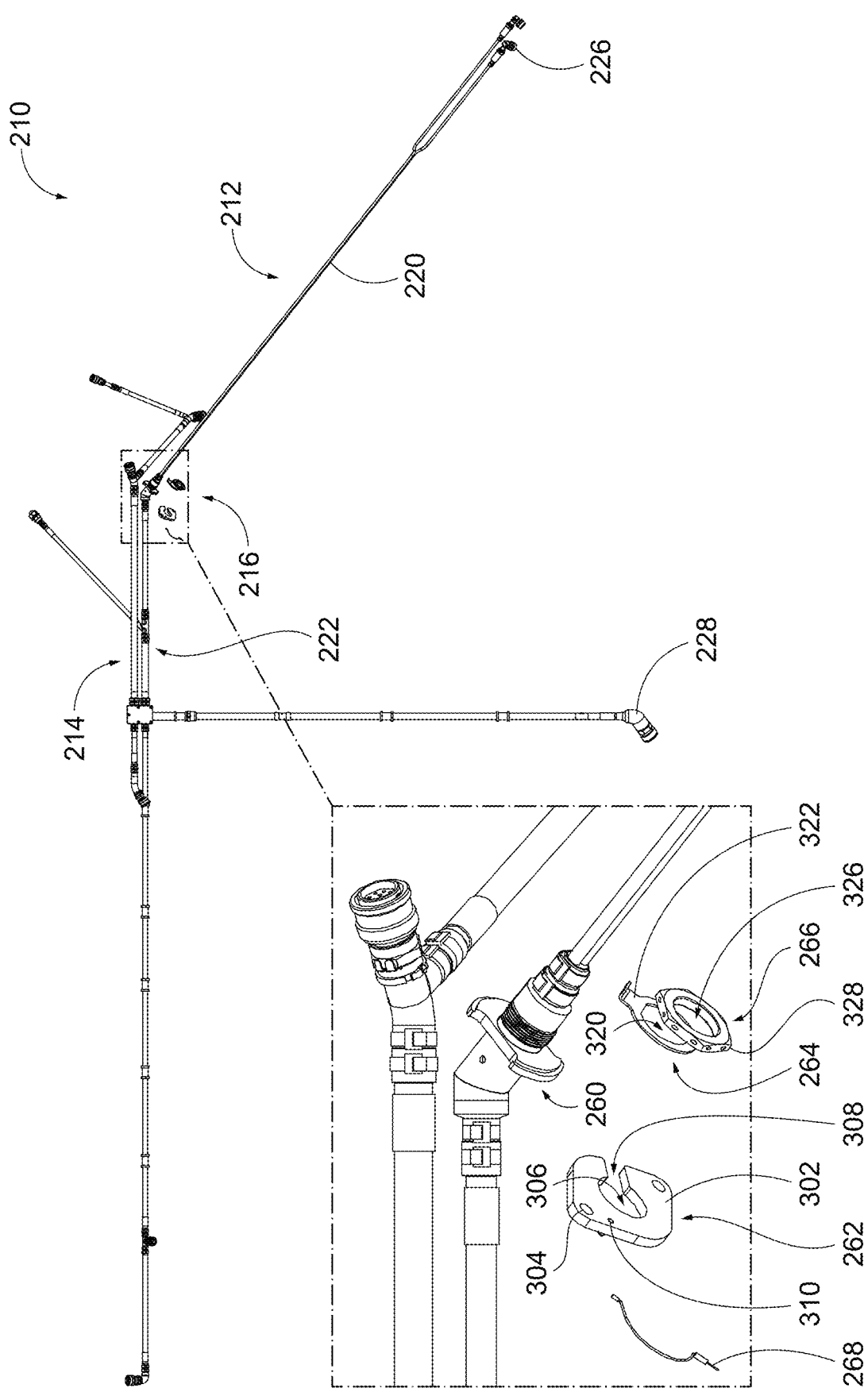
FIG. 12 is a perspective view of another exemplary wire harness.
Figure 13:
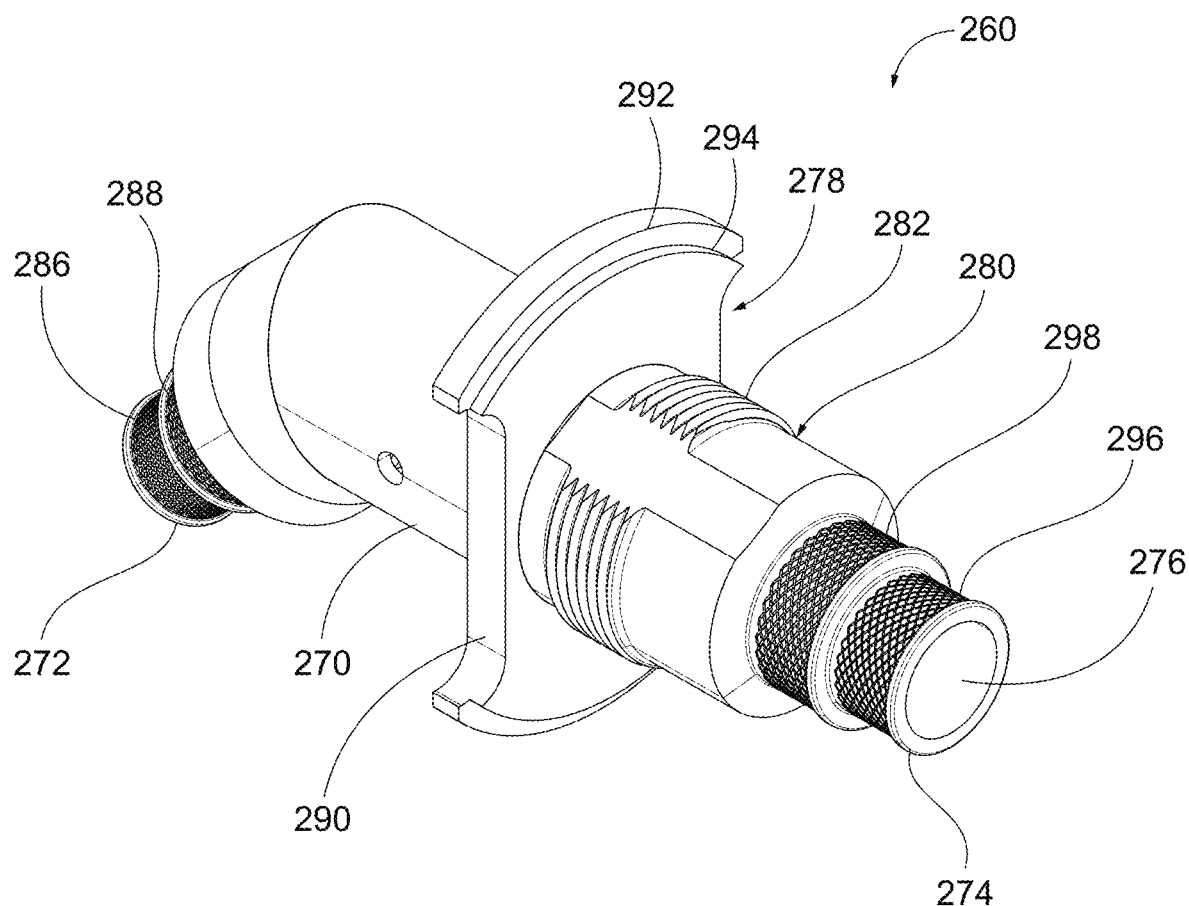
FIG. 13 is a perspective view of a junction of a transition assembly of the wire harness.
Figure 14:
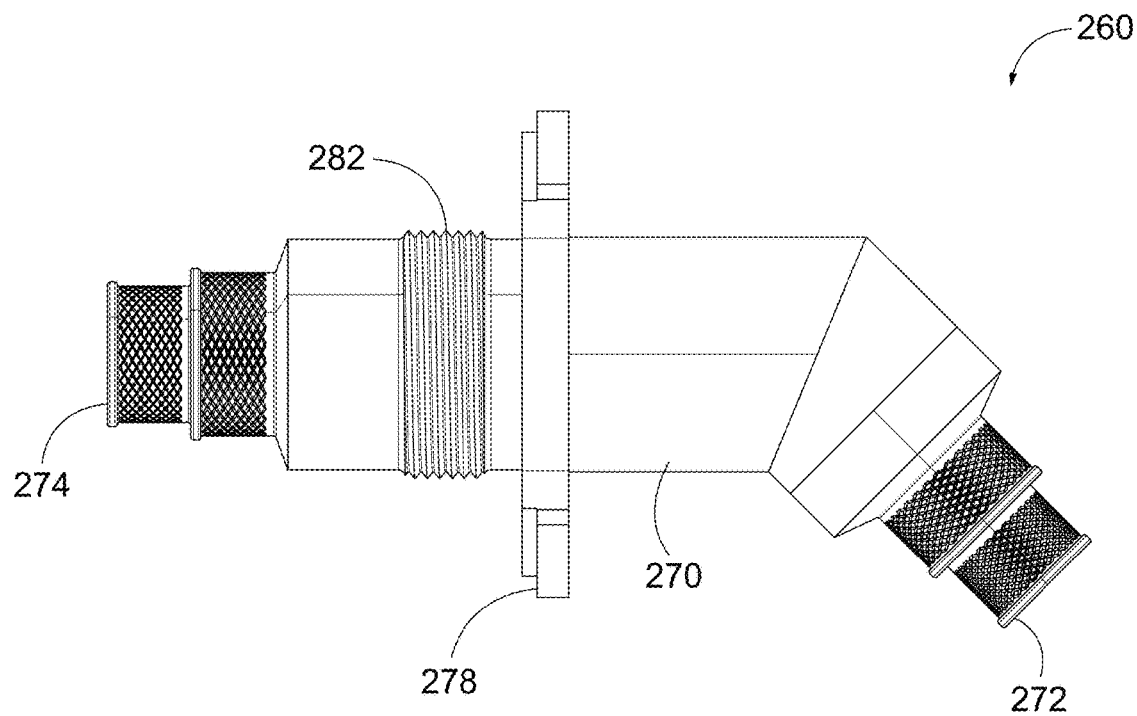
FIG. 14 is a right side view of the transition assembly.
Figure 15:
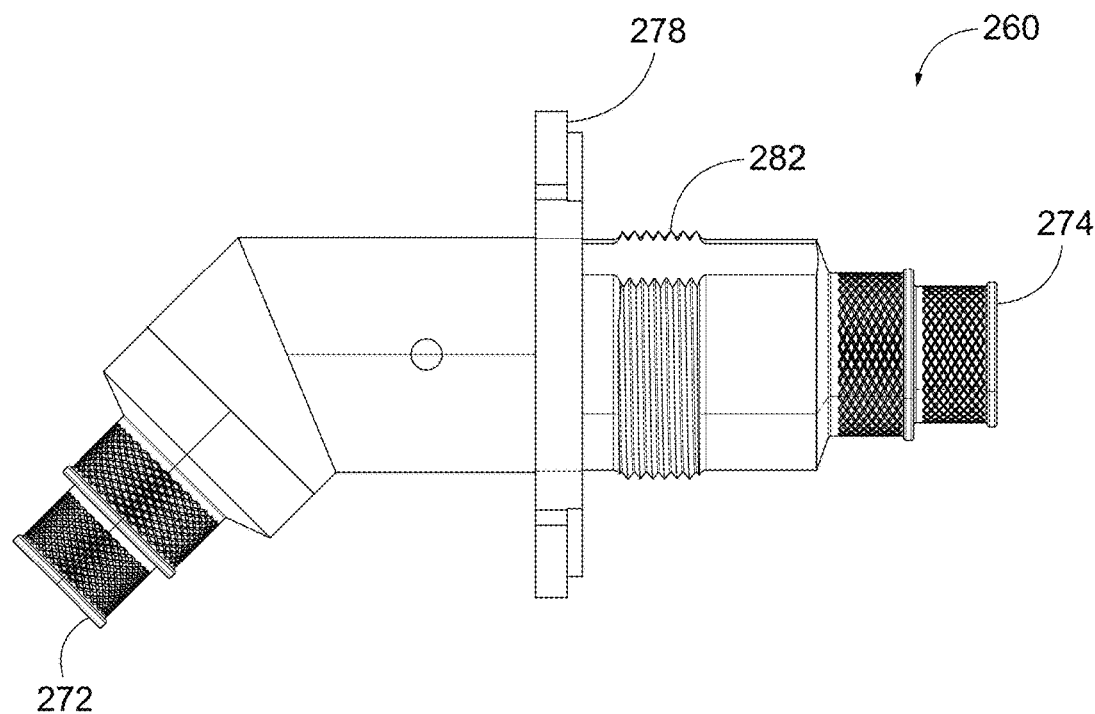
FIG. 15 is a left side view of the transition assembly.
Figure 16:
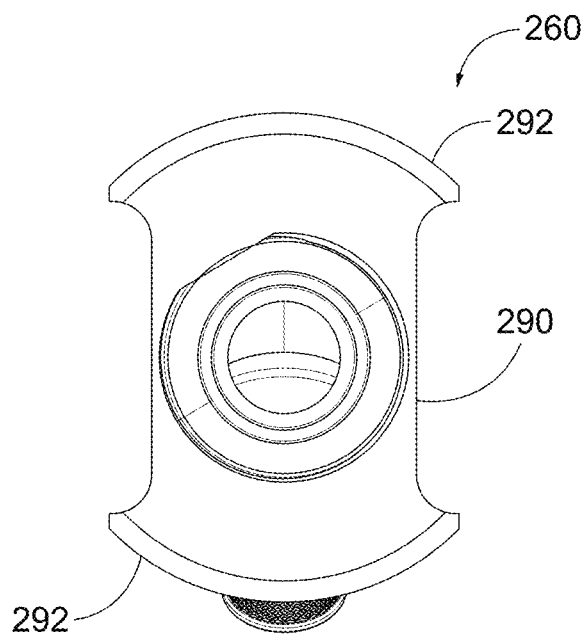
FIG. 16 is a front view of the transition assembly.
Figure 17:
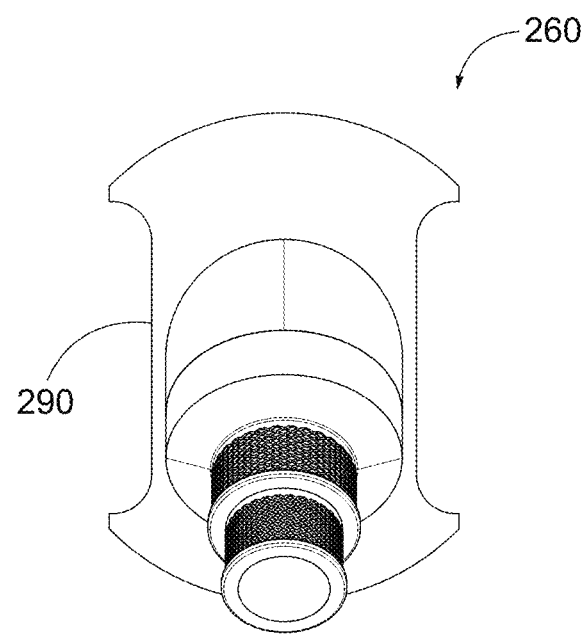
FIG. 17 is a rear view of the transition assembly.
Figure 18:
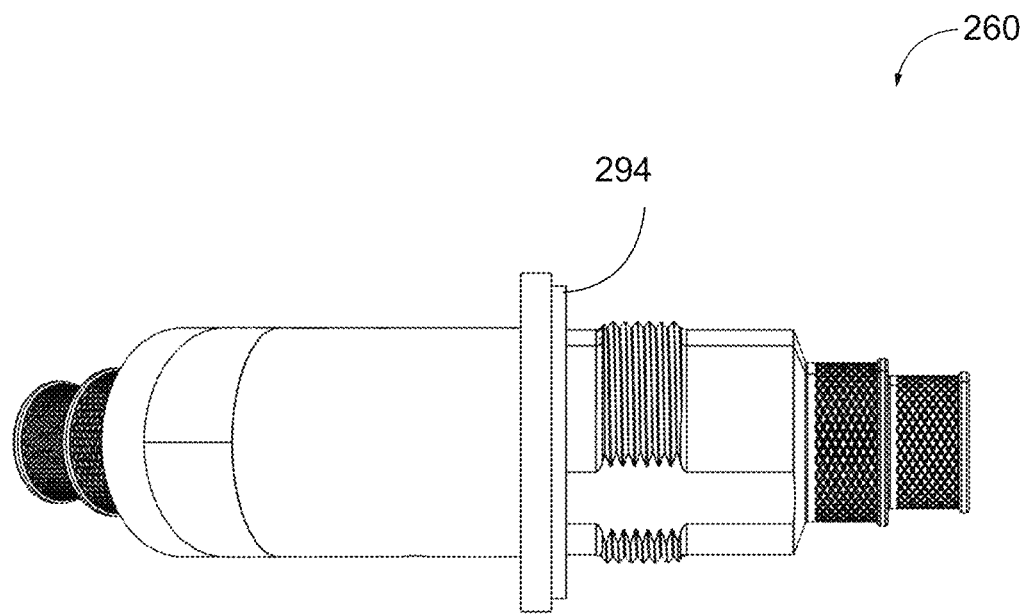
FIG. 18 is a top view of the transition assembly.
Figure 19:
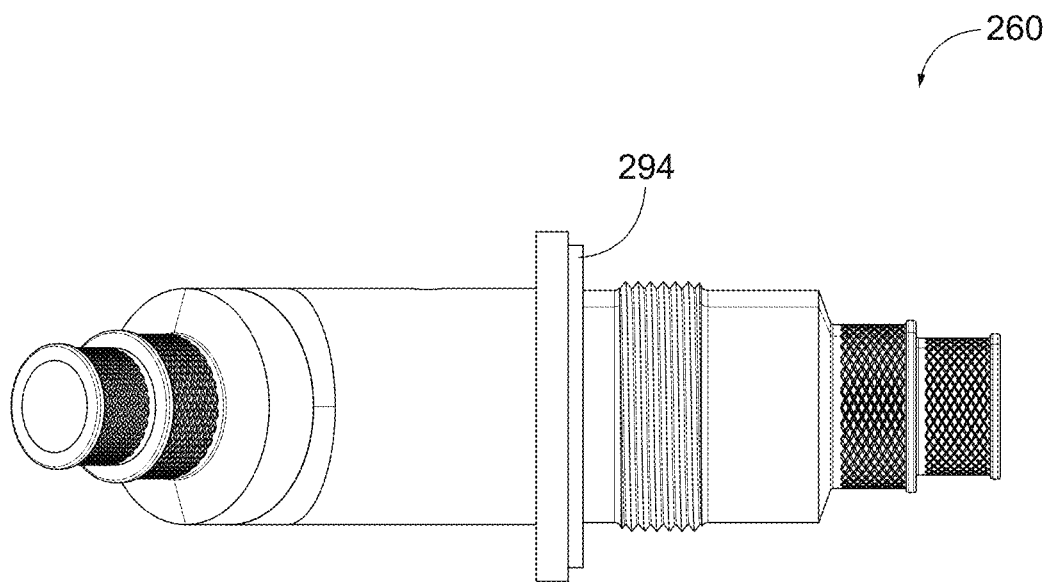
FIG. 19 is a bottom view of the transition assembly.

Turning initially to FIG. 12, the wire harness 210 includes a high temperature section 212 and a low temperature section 214 separated by a transition assembly 216 configured to be coupled to the mounting plate 218 in the aircraft. The high temperature section 212 includes a high temperature branch 220, and the low temperature section 214 includes a low temperature branch 222, which may include a plurality of branches 222. The branch 220 terminates at one or more connectors 226, and as shown a pair of connectors 226 configured to be coupled to probe assemblies on the engine, and the branches 222 terminate at connectors 28 where wires disposed in the branches 222 can be coupled to thermocouples.

Turning additionally to FIGS. 13-19, the transition assembly 216 will be described in detail. The transition assembly 16 includes a junction 260, a slotted flange 262, a washer 264, a nut 266, and a cable 268. The junction 260 includes a body 270 having a first end 272 configured to be coupled to the low temperature branch 222, a second end 274 configured to be coupled to the high temperature branch 220, and a passage 276 extending therethrough for wires to pass through the junction 260. An area of the junction 260 is angled from the body 270 toward the first end 272 to allow for the junction 260 to fit within the aircraft. The junction 260 also includes a flange 278 surrounding the body 270 configured to abut the low temperature side 32 of the mounting plate 18, and an attachment area 280 on the body 270 between the second end 274 and the flange 728. The attachment area 280 may include threads 282 configured to mate with corresponding threads on the nut 266 to secure the junction 260 to the mounting plate 18.

The flange 278 includes cutouts or scallops 290 on opposite sides thereof that extend inward toward the body 270 reducing a width of a portion of the flange 278 in a longitudinal direction perpendicular to a longitudinal direction of the body 270. The cutouts 290 allow the junction 260 to be rotated and otherwise moved during installation in the aircraft to provide clearance and avoid interference with bolts, fittings, and other components installed around the engine of the aircraft. The flange 278 also can include abutment regions 292 above and below the cutouts 290 providing increased surface area for the flange 278 to increase the contact between the flange 278 and the mounting plate 18 around the opening 36, and ledges 294 configured to abut inner surfaces of the mounting plate 18 in the opening 36.

The body 270 can also include stepped regions 286 and 288 at the first end 272 and stepped regions 296 and 298 at the second end 274. The stepped regions have differing diameters from one another to receive sheaths of the wire harness. Suitable bands of the wire harness may be placed over the sheaths to secure the sheaths to the respective stepped region 286, 288, 296, 298.

The slotted flange 262 includes a first side configured to abut the high temperature side 30 of the mounting plate 18, a second side 302 configured to be abutted by the washer 264, a pair of openings 304, a through hole 306, a slot 308 into the through hole 306, and an orientation projection 310 configured to be received in the orientation opening in the mounting plate 18 to align the slotted flange 262. The pair of openings 304 are configured to receive the fasteners to allow the fasteners to be coupled to the clips. The through hole 306 is configured to allow wires to extend therethrough and the slot 308 extends from the through hole 306 to an outer edge of the slotted flange 262 to allow the slotted flanged 262 to be placed around the wires once positioned by the mounting plate 18.

The washer 264 includes a through hole 320 to allow wires to extend therethrough and a projection 322 extending from a side and having an opening for receiving the cable 268. Similarly, the nut 266 includes a through hole 326 to allow wires to extend therethrough and openings 328 in the side for receiving the cable 268. The cable 268 is woven through at least two of the openings 328 and has one end extending through the opening in the projection 322 and another end extending out one of the openings 328 to prevent the nut 266 from uncoupling from the junction 260 during use, for example due to vibration.

The transition assembly 216 may be installed in a same manner as the transition assembly 16. In an implementation, the transition assembly 16 and the transition assembly 216 may be coupled to the mounting plate 18. In another implementation, two transition assemblies 16 may be installed or two transition assemblies 216 may be installed.

Although certain embodiments have been shown and described, it is understood that equivalents and modifications falling within the scope of the appended claims will occur to others who are skilled in the art upon the reading and understanding of this specification.

What is claimed is:

1. A transition assembly of a wire harness configured to be coupled to a plate in an aircraft, the transitional assembly including:
    a slotted flange configured to abut a first side of the plate;
    a junction having a flange configured to abut a second side of the plate, the flange including inwardly extending cutouts on opposite sides thereof forming a reduced width portion of the flange; and
    a nut configured to couple to the junction.

2. The transition assembly according to claim 1, wherein the junction additionally includes a body a body having a first end, a second end configured to extend through an opening in the plate, and a passage extending therethrough, and wherein the flange surrounds the body.

3. The transition assembly according to claim 2, wherein the junction additionally includes an attachment area on an outer surface of the body between the second end and the flange, and wherein the nut is configured to couple to the junction at the attachment area.

4. The transition assembly according to claim 1, wherein the flange of the junction includes a first portion between the cutouts with a first width in a lateral direction perpendicular to a longitudinal direction of the junction and a second portion with a second width in the lateral direction greater than the first width.

5. The transition assembly according to claim 4, wherein the second portion includes a pair of abutment regions above and below the first portion that abut the second side of the plate.

6. The transition assembly according to claim 5, wherein the second portion includes a ledge configured to abut an inner surface of an opening in the mounting plate.

7. The transition assembly according to claim 1, wherein the slotted flange includes a first side configured to abut the first side of the plate, a second side configured to be abutted by a washer, a through hole, and a slot into the through hole.

8. The transition assembly according to claim 7, wherein the slotted flange additionally includes a pair of openings for receiving respective fasteners for coupling the slotted flange to the plate, and an orientation projection configured to be received in an orientation opening in the plate for aligning the slotted flange.

9. The transition assembly according to claim 1, further including a washer configured to be positioned between the nut and the slotted flange and to abut the slotted flange.

10. The transition assembly according to claim 9, wherein the washer includes a through hole to allow for positioning over the junction and a projection having an opening, and wherein the nut includes a through hole to allow for positioning over the junction and at least two openings in the side thereof.

11. The transition assembly according to claim 10, further including a cable extending through the opening in the projection and the at least two openings in the nut to prevent the nut from uncoupling form the junction.

12. A junction configured to be coupled to a plate in an aircraft, the junction including:
- a body having a first end, a second end configured to extend through an opening in the plate, and a passage extending therethrough between the first and second ends,
- a flange surrounding the body and configured to abut a side of the plate, the flange including a first portion with a first width in a lateral direction perpendicular to a longitudinal direction of the body and a second portion with a second width in the lateral direction greater than the first width; and
- an attachment area on an outer surface of the body between the second end and the flange.

13. The junction according to claim 12, wherein the flange includes cutouts on opposite sides thereof reducing the width of the flange, and wherein the first portion is formed between the cutouts.

14. The junction according to claim 12, wherein the attachment area includes threads for mating with corresponding threads on a nut.

15. The junction according to claim 12, wherein the second portion includes a pair of abutment regions above and below the first portion that abut the side of the plate.

16. The junction according to claim 15, wherein the second portion includes a ledge configured to abut an inner surface of the opening in the mounting plate.

17. A method of installing a wire harness in a compartment in an aircraft, the wire harness including a high temperature section and a low temperature section separated by a transition assembly, the transition assembly including a junction having a flange with cutouts on opposite sides thereof, the method including:
- advancing the high temperature section of the wire harness through an opening in a plate in the compartment of the aircraft;
- navigating the transition assembly around components in the compartment;
- coupling the transition assembly to the plate; and
- coupling connectors of the wire harness with corresponding connectors in the aircraft.

18. The method according to claim 17, wherein the cutouts on the flange enable navigation of the junction around the components in the compartment.

19. The method according to claim 17, wherein coupling the transition assembly to the plate includes:
- positioning the junction such that an end of the junction extends through the opening in the plate and the flange abuts a second side of the plate;
- positioning a slotted flange relative to the plate such that the slotted flange abuts a first side of the plate;
- securing the slotted flange to the plate;
- advancing a washer of the transition assembly until the washer abuts the slotted flange; and
- advancing a nut of the transition assembly over the end of the junction to threadably couple the nut to the junction.

20. The method according to claim 19, wherein coupling the transition assembly further includes coupling a cable to the washer and the nut to prevent accidental removal of the nut.

* * * * *